United States Patent
Latief et al.

(10) Patent No.: US 10,343,952 B2
(45) Date of Patent: Jul. 9, 2019

(54) CERAMIC ARTICLE AND METHOD FOR PRODUCING SAME

(71) Applicant: Duravit Aktiengesellschaft, Hornberg (DE)

(72) Inventors: Othmar Latief, Gengenbach (DE); Sebastian Sander, Mühlenbach (DE); Thomas Stammel, Hornberg (DE)

(73) Assignee: DURAVIT AKTIENGESELLSCHAFT, Hornberg (DE)

( * ) Notice: Subject to any disclaimer, the term of this patent is extended or adjusted under 35 U.S.C. 154(b) by 0 days.

(21) Appl. No.: 15/819,386

(22) Filed: Nov. 21, 2017

(65) Prior Publication Data

US 2018/0141874 A1   May 24, 2018

(30) Foreign Application Priority Data

Nov. 24, 2016   (DE) .................... 10 2016 122 709

(51) Int. Cl.

| B32B 15/04 | (2006.01) |
|---|---|
| B32B 17/06 | (2006.01) |
| C04B 41/86 | (2006.01) |
| C03C 3/108 | (2006.01) |
| C03C 8/12 | (2006.01) |
| C03C 8/20 | (2006.01) |
| C04B 33/34 | (2006.01) |
| C04B 41/00 | (2006.01) |
| C04B 41/50 | (2006.01) |
| C03C 8/10 | (2006.01) |
| C04B 111/20 | (2006.01) |

(52) U.S. Cl.
CPC .............. C04B 41/86 (2013.01); C03C 3/108 (2013.01); C03C 8/10 (2013.01); C03C 8/12 (2013.01); C03C 8/20 (2013.01); C04B 33/34 (2013.01); C04B 41/009 (2013.01); C04B 41/5022 (2013.01); C03C 2204/02 (2013.01); C04B 2111/2092 (2013.01)

(58) Field of Classification Search
USPC ................................ 428/426, 428, 432, 688
See application file for complete search history.

(56) References Cited

U.S. PATENT DOCUMENTS

| 5,304,516 A * | 4/1994 | Clifford | .................. C03C 3/093 501/14 |
|---|---|---|---|
| 6,132,832 A * | 10/2000 | Crichton | ................... C03C 8/02 428/425.6 |
| 6,548,162 B1 * | 4/2003 | Machida | ............... C04B 41/009 4/222 |
| 2009/0104459 A1 * | 4/2009 | Campbell, Jr. | ........ A01N 59/16 428/446 |
| 2016/0081349 A1 * | 3/2016 | Campbell, Jr. | ........ A01N 59/20 428/450 |
| 2016/0219664 A1 | 7/2016 | Stammel et al. | |

FOREIGN PATENT DOCUMENTS

DE   102015101609 B3   6/2016

* cited by examiner

*Primary Examiner* — Lauren R Colgan
(74) *Attorney, Agent, or Firm* — Lucas & Mercanti, LLP

(57) ABSTRACT

A ceramic article in the form of a sanitary, culinary or laboratory article, comprising a ceramic base body and also a fired glaze applied on said base body, the fired glaze comprising $SiO_2$ at 45-55 mass %, $Al_2O_3$ at 6-12 mass %, ZnO at 15-35 mass %, and additionally PbO at 0.1-15 mass % and/or CuO at 0.025-2 mass % and/or $Bi_2O_3$ at 0.25-7 mass %.

22 Claims, 2 Drawing Sheets

CERAMIC ARTICLE AND METHOD FOR PRODUCING SAME

CROSS-REFERENCE TO RELATED APPLICATIONS

The present application claims priority of DE 10 2016 122 709.9, filed Nov. 24, 2016, the priority of this application is hereby claimed and this application is incorporated herein by reference.

BACKGROUND OF THE INVENTION

The invention relates to a ceramic article, more particularly in the form of a sanitary, culinary or laboratory article.

Ceramic articles are articles produced from ceramic materials or comprising ceramic materials as essential constituents, and have been known for a long time. The known areas of application or use of such ceramic articles include, in particular, sanitary articles such as, for example, WCs, wash basins, shower trays, bath tubs, bidets, urinals, etc., but also culinary articles such as, for example, kitchen tops or work tops, dishes, trays or the like, or corresponding laboratory articles, likewise in the form for example of dishes, trays and the like, with this enumeration of course not being exhaustive.

A ceramic article of this kind consists customarily of a fired ceramic base body and also of a likewise fired glaze which is applied to this base body and which forms the surface of the article. This glaze is customarily applied in the form of a slip to the ceramic base body, which is either unfired or has already undergone preliminary firing, and is subsequently fired conventionally in a firing at sufficient temperature.

Particularly in the aforementioned areas of application or use, antibacterial properties may be useful or required of respective ceramic articles to be employed therein. A commercially customary glaze not specifically adapted in terms of its composition does not have any notable antibacterial quality. In order to endow the glaze with an enhanced antibacterial quality, it is known practice, from DE 10 2015 101 609 A1, for example, to provide the glaze with a high fraction of zinc oxide, specified therein at more than 35 mass %. Tests with glazed test bodies in accordance with the common test standard (JIS=Japanese Industrial Standard) JIS Z 2801: 2010 showed a reduction in the *Escherichia coli* test microbes applied to the test bodies of approximately 3.0 $\log_{10}$ steps, corresponding to a reduction of approximately 99%, which means that microbial growth can already be reduced strikingly with such a glaze.

There is nevertheless a requirement for a glaze which is improved further relative to this.

SUMMARY OF THE INVENTION

The problem addressed by the invention, accordingly, is that of specifying a ceramic article having a glaze which is improved in terms of its antibacterial properties.

For the solution to this problem, in accordance with the invention, a ceramic article is provided, more particularly in the form of a sanitary, culinary or laboratory article, comprising a ceramic base body and also a fired glaze applied on said base body, the fired glaze comprising $SiO_2$ at 45-55 mass %, $Al_2O_3$ at 6-12 mass %, ZnO at 15-35 mass %, and additionally PbO at 0.1-15 mass % and/or CuO at 0.025-2 mass % and/or $Bi_2O_3$ at 0.25-7 mass %.

The glaze provided in the case of the ceramic article of the invention comprises not only the typical glaze constituents that are $SiO_2$ (45-55 mass %) and $Al_2O_3$ (6-12 mass %) and also the typical glaze constituents that are fluxes (e.g., $K_2O$, $Na_2O$ and/or CaO) and opacifiers (e.g., $ZrO_2$, SnO), and any other typical glaze impurities, but also ZnO at 15-35 mass % to start with, in other words likewise in a significant fraction. Furthermore, the metal oxides which are substantial determinants of the antibacterial properties are included, namely PbO at 0.1-15 mass % and/or CuO at 0.025-2 mass % and/or $Bi_2O_3$ at 0.25-7 mass %. These three stated metal oxides may alternatively be present alone, or at least two of them as a mixture, or all three. It has emerged that through the addition of one or more of these oxides, the antibacterial quality of the glaze can be improved markedly relative to the existing glaze comprising ZnO to a high degree. In total, the glaze, taking account of all of the constituents, in other words those explicitly stated and also the other fluxes and opacifiers and any impurities, of course comprises 100 mass %.

In accordance with the invention, the ZnO content is reduced, and it is replaced at least in part by one or more of the stated metal oxides PbO, CuO or $Bi_2O_3$.

By integrating one or more of the stated metal oxides, it has been possible to produce in the glaze a reduction in the test microbes of more than 5 $\log_{10}$ steps, in some cases even of 6 $\log_{10}$ steps; from a reduction of 5 $\log_{10}$ steps upward, the effect is referred to no longer as antibacterial but rather as a disinfectant effect. This means that the ceramic article of the invention or the glaze of the invention, respectively, displays disinfectant properties. The meaning of this is that microbial growth is completely prevented, and therefore no microbial colonization takes place on the glaze surface.

The activity of the glaze of the invention is based on the oligodynamic effect. This oligodynamic effect describes the damaging effect of metal cations on living cells. Superficially, then, in the glaze of the invention, in addition to the Zn ions, there are additionally cations originating from one or more of the stated metal oxides, specifically Pb cations and/or Cu cations and/or Bi cations. As has emerged to be the case, these metal cations have a particularly high damaging effect, thus resulting in the extremely high microbe reduction.

In the fractional range specified in each case, particularly of the ZnO, of the PbO, of the CuO, and of the $Bi_2O_3$, all of the mass % fractions are conceivable and relevant. This means that within the glaze, all values lying between the respectively stated minimum and maximum values can be present as the corresponding oxide fraction in the glaze and are essential to the invention. Consequently, any intermediate value between the stated minimum and maximum values of the respective interval is deemed to have been disclosed as essential to the invention, particularly in respective steps of 0.1 mass %.

In the completed state, the ceramic article, as described, has a ceramic base body which typically defines the geometry of the ceramic article, since the glaze is only very thin and is typically in the region of one or a few millimeters. This glaze need not be applied over the entire surface of the ceramic article, but may instead also be applied only sectionally—for example, on the facing side, with the rear-side areas remaining unglazed, for example. It is naturally also possible for the ceramic article to be glazed completely, in other words on all surfaces. Besides the sanitary, culinary or laboratory articles identified at the outset, whose enumeration is not exhaustive, a ceramic article may alternatively take the form, for example, of a tile for the interior or exterior, a tile such as a roofing tile, a crockery component in the form, for example, of a cup, a plate, a platter, etc., or the form of a jewelry part.

In further particularization of the respective fraction or fractions of PbO, CuO or $Bi_2O_3$, the invention provides for the PbO content to be between 0.5-12 mass % and/or the CuO content to be between 0.05-1.5 mass % and/or the $Bi_2O_3$ content to be between 0.35-6 mass %.

In further particularization of the respective oxide fractions, the PbO content ought to be between 0.75-10 mass % and/or the CuO content ought to be between 0.075-1.25 mass % and/or the $Bi_2O_3$ content ought to be between 0.5-5 mass %.

More particularly, the PbO content ought to be between 1-8 mass % and/or the CuO content ought to be between 0.1-1 mass %.

As described, either only one of the metal oxides, PbO, CuO or $Bi_2O_3$, may be present in the glaze of the invention; besides this, it is also possible for two of these oxides to be present in the glaze, or all three. Where two or three of these oxides are present, the respective fractions thereof, even in the mixing scenario, may amount to the mass % fractions specified at the outset, with the respective specified minimum and maximum values. Here as well it is the case that, for oxide mixtures, all fractional combinations of the values lying within the respective mass % intervals, or defined via these intervals, respectively, may be present. In relation to oxide mixtures as well, accordingly, all fractions or mixing ratios, respectively, which result from the values lying within the respective intervals, are disclosed as essential to the invention. This means that where PbO and CuO are present, for example, each of the oxides may be present in any desired mass % fraction as is given by the fractional interval specified at the outset in each case.

It has emerged as being particularly useful and particularly effective if both PbO and CuO, but not $Bi_2O_3$, are present in the glaze; in this context, as observed, PbO and CuO may be present in the glaze with any within the intervals stated above. Test bodies with glazes which contained PbO and CuO, but not $Bi_2O_3$, gave the best results, a fact which will be further addressed below. Alternatively, it is useful if the article comprises only $Bi_2O_3$, but not PbO and CuO. In relation to $Bi_2O_3$, the best results were achievable with a glaze which contains only $Bi_2O_3$, but none of the other oxides PbO and CuO.

The amount of ZnO as well is variable, as described, within the 15-35 mass % interval specified at the outset. In no case, however, does it amount to more than 35 mass %, and is probably much less, since, in particular, the ZnO fraction is replaced by the added oxide or oxides.

Accordingly, in one useful development of the invention, it is conceivable for the ZnO content to be between 18-32 mass %, more particularly between 20-30 mass %. With particular preference the ZnO fraction is between 22-28 mass %, more particularly, though not exclusively, if PbO and CuO are present as effective oxides. Here again the rule is that any intermediate value lying within the interval, in 0.1 mass % steps, for example, is deemed to be disclosed as essential to the invention.

The layer thickness of the glaze ought to be between 0.1-3 mm, more particularly between 0.5-1 mm. As already described in the introduction, it may be applied only sectionally or over the entire area of the ceramic base body.

Besides the ceramic article itself, the invention further relates to a method for producing a ceramic article of the type described above. This method is characterized by the following steps:

providing a ceramic base body which is unfired or has undergone preliminary firing, applying a glaze coating using a slip comprising a lead frit containing at least 80 mass % of PbO, at 0.12-18 mass % and/or CuO powder at 0.025-2 mass % and/or $Bi_2O_3$ powder at 0.25-7 mass %, carrying out firing to form a fired glaze at a temperature of 1100-1350° C.

The glaze coating is produced and applied, respectively, in the form of a slip which is prepared at least from the glaze raw materials that are typical per se, such as quartz, kaolin, kaolin chamotte, calcium carbonate, dolomite, feldspar, zirconium silicate and zinc oxide in addition to make-up water. Added to this batch are only one or more of the stated metal oxides PbO, CuO and/or $Bi_2O_3$. The PbO is added in the form of a lead frit containing at least 80 mass % of PbO as well as $SiO_2$. On account of the $SiO_2$ fraction, a somewhat greater amount of lead frit needs to be weighed in, based on the PbO content of the fired glaze, and consequently, in accordance with the invention, lead frit is added at between 0.12-18 mass %.

The CuO is added in powder form, specifically as pure CuO powder, which is why it is added at 0.025-2 mass %. The same applies in the case of the $Bi_2O_3$ powder, which can likewise be added as a pure powder and therefore at 0.25-7 mass %. Here as well, of course, corresponding variations to quantities are possible within the intervals, and also only one or mixtures of two or more of the stated oxides are possible.

Preference is given to using a slip comprising the stated lead frit at 0.6-14.4 mass % and/or CuO powder at 0.05-1.5 mass % and/or $Bi_2O_3$ powder at 0.35-6 mass %. The lead frit introduced with this fraction leads to a PbO content of the fired glaze of approximately 0.5-12 mass %.

In a further particularization, a slip can be used which uses lead frit at 0.9-12 mass % and/or CuO powder at 0.075-1.25 mass % and/or $Bi_2O_3$ powder at 0.5-5 mass %. The lead frit weighed in accordingly leads to a PbO content of the fired glaze of approximately 0.75-10 mass %.

Lastly, a slip can be used comprising lead frit at 0.12-9.6 mass % and/or CuO powder at 0.1-1 mass %. The lead frit weighed in with this fraction leads to a PbO content of the fired glaze of approximately 0.1-8 mass %.

Preference is given to using a slip in which either both PbO and CuO, but not $Bi_2O_3$, or $Bi_2O_3$, but not PbO and CuO, are included.

The ZnO content of the slip is also variable. As described in the introduction, the ZnO content may be 15-35 mass %. In further particularization, a slip containing ZnO at 18-32 mass %, more particularly 20-30 mass %, may be used. Particular preference is given to using a slip containing ZnO at 22-28 mass %.

The glaze coating, in a further embodiment of the method of the invention, is applied with a layer thickness of 0.1-3 mm, more particularly of 0.5-1 mm. This may be done in a printing, more particularly screen printing, casting, injecting, spraying, spreading or dipping process, or in a combination of at least two of the stated processes.

Glazing is carried out as described by firing in the temperature range between 1100-1350° C. This temperature range is appropriate both when using an unfired ceramic base body and also a ceramic base body (ceramic bodies) which has undergone preliminary firing. Within the stated temperature range, sufficient melting of the raw materials contained in the glazing slip is possible, without these materials being excessively liquefied. The firing temperature is preferably between 1130-1300° C.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
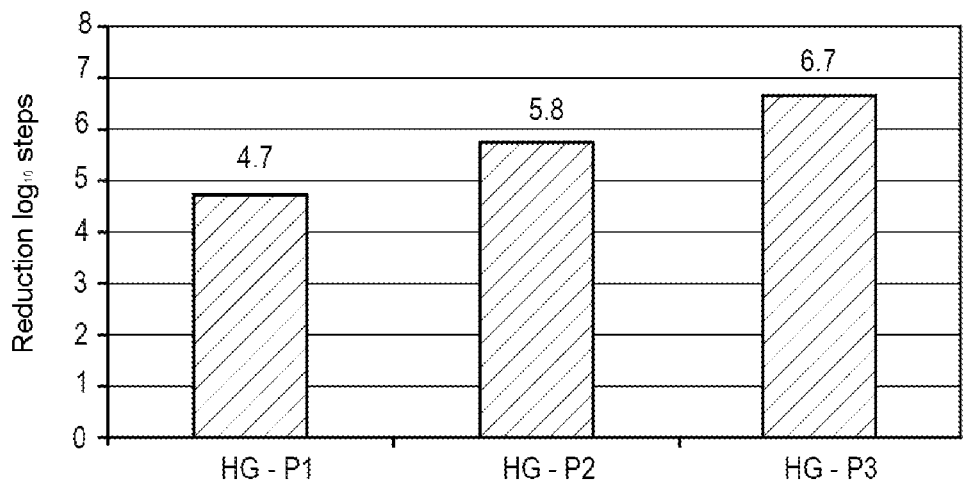
FIG. 1 shows a table for illustrating the antibacterial effect of three test bodies containing ZnO, PbO and CuO, where the PbO content is varied and the ZnO and CuO content is substantially constant.

A series of inventive glazes and comparative glazes were produced as part of the experimental procedure outlined below.

Each test body consisted of a ceramic base body in the form of a ceramic plate, which was then coated in a spraying process with a slip made up accordingly and produced in accordance with the glaze composition to be investigated. The test bodies were then each fired in an oxidizing atmosphere at a temperature of approximately 1280° C. for a time of 19 hours.

The individual test bodies were subsequently investigated for the antimicrobial activity of the respective glaze applied, in accordance with the JIS Z 2801: 2010 test standard "Antibacterial products—Test for antibacterial activity and efficacy". As part of the investigation, a defined amount of *Escherichia coli* test microbes was applied to each glaze surface. The same quantity of test microbes was also applied to the glass surface of a glass body. Both bodies were incubated under defined test conditions for 24 hours. This was followed by a count of the number of colony-forming units on both test surfaces (glaze surface and glass surface). Addition of the amount of the reduction rate of microbes on the glaze surface to the amount of the growth rate of the microbes on the glass area gives the reduction rate, which is expressed in $\log_{10}$ steps. One $\log_{10}$ step corresponds to the reduction of the microbes by one power of ten. An antibacterial effect is said to be present when the reduction is 2 $\log_{10}$ steps or more; a reduction of 5 $\log_{10}$ steps or more is referred to as disinfection.

First of all, a standard glaze SG without ZnO, PbO, CuO and $Bi_2O_3$ was prepared. The slip contained the following raw materials:

| Raw material | mass % |
| --- | --- |
| Quartz | 29.10 |
| Calcium carbonate | 21.30 |
| Feldspar | 17.80 |
| Chamotte | 12.50 |
| Zirconium silicate | 10.50 |
| Glass frit | 4.60 |
| Kaolin | 4.20 |

The raw materials listed were used to prepare a slip, for which the raw materials are dispersed in water.

This slip was applied by spraying to a ceramic base body in plate form which had been subjected to preliminary firing (prefired), the layer thickness being approximately 1 mm. The sample body was then fired at approximately 1280° C. for 19 h in order to form the fired glaze.

The composition of the fired standard glaze SG was as follows:

| Oxide | mass % |
| --- | --- |
| $SiO_2$ | 62.61 |
| $Al_2O_3$ | 11.50 |
| $TiO_2$ | 0.16 |
| $Fe_2O_3$ | 0.21 |
| CaO | 12.60 |
| $K_2O$ | 0.43 |
| MgO | 1.11 |
| $Na_2O$ | 2.58 |
| $B_2O_3$ (ICP) | 0.53 |
| $P_2O_5$ | 0.05 |
| SrO | 0.02 |
| ZnO | 0.03 |
| $ZrO_2$ | 8.00 |
| $HfO_2$ | 0.16 |

The differences relative to the initial weighings derive, as is known, from a certain loss on ignition during firing.

This standard glaze SG was then investigated for its antibacterial effect on the basis of the JIS test. Following evaluation of the test, a reduction in the formation of test microbes on the standard glaze SG of around −0.76 $\log_{10}$ steps was found, this being synonymous with no antibacterial effect at all. This means that the standard glaze SG without ZnO or one of the other stated metal oxides has no antimicrobial properties.

A further comparative glaze HG1 was then prepared. The relevant slip was produced from the following raw materials:

| Raw materials | mass % |
| --- | --- |
| Quartz | 32.72 |
| Chamotte | 8.71 |
| Kaolin | 4.24 |
| Calcium carbonate | 6.56 |
| Dolomite | 1.90 |
| Zinc oxide | 26.40 |
| Glass frit | 2.86 |
| Tin oxide | 0.62 |
| Feldspar | 6.83 |
| Zirconium silicate | 9.16 |

This slip as well was then applied by spraying to a prefired ceramic body, with the layer thickness here again being approximately 1 mm. The sample body was subsequently fired.

The composition of the fired glaze HG1 was as follows:

| Oxide | mass % |
|---|---|
| $SiO_2$ | 50.17 |
| $Al_2O_3$ | 7.25 |
| $TiO_2$ | 0.10 |
| $Fe_2O_3$ | 0.16 |
| CaO | 4.52 |
| $K_2O$ | 0.33 |
| MgO | 0.50 |
| $Na_2O$ | 5.62 |
| $B_2O_3$ (ICP) | 0.84 |
| $Li_2O$ (ICP) | 0.05 |
| $P_2O_5$ | 0.02 |
| $SnO_2$ | 0.61 |
| ZnO | 24.00 |
| $ZrO_2$ | 5.74 |
| $HfO_2$ | 0.10 |

The differences relative to the initial weighings derive, as is known, from a certain loss on ignition during firing.

This glaze as well, already improved through the addition of ZnO, was subjected to the JIS test. An antibacterial effect emerged which was already good. A test microbe reduction by 3.82 $\log_{10}$ steps was measured.

A test body with a glaze HG2 was then produced, originating from a slip in accordance with the glaze HG1 in its raw materials composition. This slip was admixed with PbO at approximately 5 mass %, in the form of a lead frit containing at least 80% PbO. The CuO was added in the form of CuO powder at 0.25 mass %. The fractions of the other slip raw materials were reduced accordingly, the reduction taking place in particular in relation to the quartz.

The slip prepared was sprayed onto a prefired ceramic base body, the layer thickness being approximately 1 mm. The test body was subsequently fired in order to form the fired glaze.

The composition of the glaze HG2 was as follows:

| Oxide | mass % |
|---|---|
| $SiO_2$ | 48.87 |
| $Al_2O_3$ | 7.12 |
| $TiO_2$ | 0.10 |
| $Fe_2O_3$ | 0.15 |
| CaO | 4.44 |
| $K_2O$ | 0.31 |
| MgO | 0.53 |
| $Na_2O$ | 2.16 |
| $B_2O_3$ (ICP) | 0.84 |
| $Li_2O$ (ICP) | 0.04 |
| CuO | 0.24 |
| $P_2O_5$ | 0.05 |
| $SnO_2$ | 0.64 |
| ZnO | 24.79 |
| $ZrO_2$ | 5.79 |
| $HfO_2$ | 0.09 |
| PbO | 3.86 |

The differences relative to the initial weighings derive, as is known, from a certain loss on ignition during firing.

For this test body as well, its antibacterial activity was then ascertained in accordance with the JIS standard test. The glaze of the invention, or its surface, displayed an outstanding antibacterial quality. A test microbe reduction of 6.9 $\log_{10}$ steps was ascertained. The activity was a massive improvement on the HG1 glaze, which already displays good antibacterial properties. The glaze layer produced exhibits not only an antibacterial but also a disinfectant effect. Consequently, no microbes at all were found any longer on the glazed surface.

This means that, evidently, a combination of PbO and CuO in a ZnO-containing glaze exhibits outstanding antibacterial and disinfectant properties, respectively.

In order to clarify the effect of a varying PbO content, three different slips were prepared, again starting from the raw materials batch as per the HG1 glaze.

These slips were each admixed with a constant CuO content of approximately 0.25 mass %. The PbO fraction, however, varied. It was approximately 1 mass % in the first glaze slip HG-P1, approximately 2 mass % in the second slip HG-P2, and approximately 8 mass % in the third glaze slip HG-P3. The fractions of the other raw materials, particularly of the quartz, were adapted accordingly.

The respective slips were applied in turn by spraying to a prefired ceramic test body, in each case with a layer thickness of 1 mm. The test bodies were subsequently fired in order to produce three different glazes HG-P1, HG-P2 and HG-P3.

The compositions of the fired glazes HG-P1, HG-P2 and HG-P3 were as follows:

| Oxide | HG-P1 mass % | HG-P2 mass % | HG-P3 mass % |
|---|---|---|---|
| $SiO_2$ | 49.54 | 49.58 | 48.14 |
| $Al_2O_3$ | 8.85 | 8.67 | 7.47 |
| $TiO_2$ | 0.10 | 0.10 | 0.10 |
| $Fe_2O_3$ | 0.15 | 0.15 | 0.15 |
| CaO | 5.12 | 4.83 | 4.51 |
| $K_2O$ | 0.31 | 0.31 | 0.31 |
| MgO | 0.53 | 0.53 | 0.53 |
| $Na_2O$ | 2.16 | 1.93 | 2.08 |
| $B_2O_3$ (ICP) | 0.84 | 0.82 | 0.87 |
| $Li_2O$ (ICP) | 0.04 | 0.05 | 0.04 |
| CuO | 0.24 | 0.26 | 0.25 |
| $P_2O_5$ | 0.05 | 0.05 | 0.05 |
| $SnO_2$ | 0.64 | 0.68 | 0.61 |
| ZnO | 24.79 | 24.52 | 23.21 |
| $ZrO_2$ | 5.79 | 5.84 | 5.43 |
| $HfO_2$ | 0.09 | 0.09 | 0.09 |
| PbO | 0.77 | 1.59 | 6.16 |

The respective glazes or test bodies were then again subjected to the JIS test for determining the antibacterial effect. The values ascertained were as follows:

| Glaze | $\log_{10}$ steps |
|---|---|
| HG-P1 | 4.7 |
| HG-P2 | 5.8 |
| HG-P3 | 6.7 |

The results are illustrated in FIG. 1 in the form of a diagram.

It is seen that an increase in the PbO content leads to an improvement in the reduction performance and hence in the disinfection performance. It is found that at and above a relatively low PbO fraction of just approximately 2 mass %, a $\log_{10}$ step significantly greater than 5 is achieved, and therefore there is already a disinfectant effect even with a low PbO fraction and likewise a low CuO fraction.

The results, moreover, correlate very well with the result for the glaze HG2, for which approximately 5 mass % of PbO and 0.25 mass % of CuO were weighed out and a reduction rate of 6.9 $\log_{10}$ steps was found.

A further increase in the PbO fraction to approximately 8 mass % in the slip did not lead to a further increase in the reduction rate, with the reduction capacity instead remaining virtually constant, at 6.7 $\log_{10}$ steps.

In order to shed further light on the properties of PbO and CuO, in the next step, three sample bodies with constant PbO content but varying CuO content were produced.

The starting point again was the slip batch as per the HG1 glaze. Each slip of the various sample bodies contained PbO at approximately 4 mass %. The CuO content of the slip varied: in the slip of the first sample body, it was approximately 0.1 mass %, in the slip of the second sample body approximately 0.5 mass %, and in the slip of the third sample body approximately 1 mass %.

Therefore, three different slips were made up, each with varying CuO content but constant PbO content.

The three different slips were then again sprayed onto a prefired ceramic base body, with a layer thickness of approximately 1 mm. The sample bodies were subsequently fired in order to form the respective fired glazes.

Investigation of the glazes resulted in the following oxide fractions, with the glaze containing 0.1 mass % of CuO in the slip being designated HG-C1, the glaze containing 0.5 mass % of CuO in the slip HG-C2, and the glaze containing 1 mass % of CuO in the slip HG-C3:

| Oxide | HG-C1 mass % | HG-C2 mass % | HG-C3 mass % |
|---|---|---|---|
| $SiO_2$ | 48.34 | 48.72 | 48.84 |
| $Al_2O_3$ | 8.03 | 7.84 | 7.73 |
| $TiO_2$ | 0.10 | 0.10 | 0.10 |
| $Fe_2O_3$ | 0.15 | 0.15 | 0.15 |
| CaO | 4.78 | 4.83 | 4.69 |
| $K_2O$ | 0.31 | 0.31 | 0.31 |
| MgO | 0.53 | 0.53 | 0.53 |
| $Na_2O$ | 2.13 | 2.02 | 2.03 |
| $B_2O_3$ (ICP) | 0.83 | 0.84 | 0.85 |
| $Li_2O$ (ICP) | 0.04 | 0.05 | 0.05 |
| CuO | 0.12 | 0.48 | 1.02 |
| $P_2O_5$ | 0.05 | 0.05 | 0.05 |
| $SnO_2$ | 0.61 | 0.63 | 0.64 |
| ZnO | 24.54 | 24.21 | 24.28 |
| $ZrO_2$ | 5.43 | 5.21 | 5.21 |
| $HfO_2$ | 0.09 | 0.09 | 0.09 |
| PbO | 3.92 | 3.94 | 3.97 |

For each test body, then, the antibacterial activity of the glazes HG-C1, HG-C2 and HG-C3 was ascertained, again based on the JIS 2801 test method. The results obtained were as follows:

| Glaze | $\log_{10}$ steps |
|---|---|
| HG-C1 | 5.6 |
| HG-C2 | 5.9 |
| HG-C3 | 6.3 |

Figure 2:
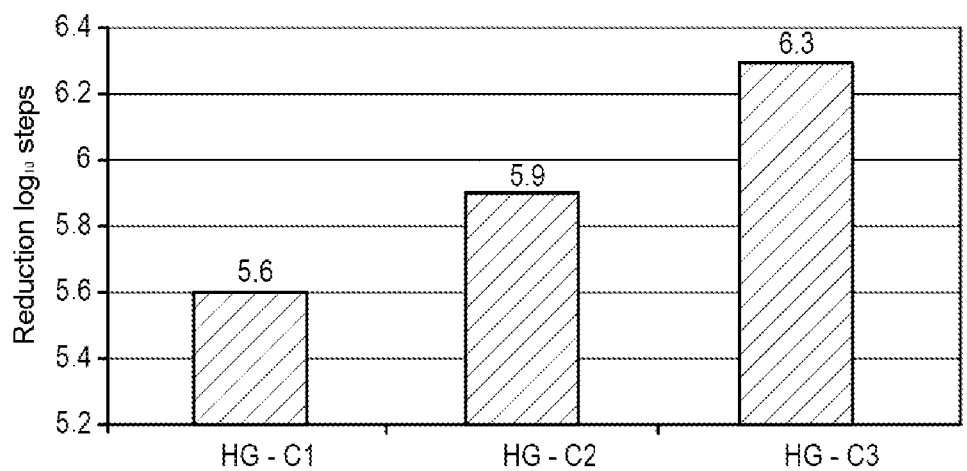
FIG. 2 shows a table for illustrating the antibacterial effect of three test bodies containing ZnO, PbO and CuO, where the CuO content is varied and the ZnO and PbO content is substantially constant.

The results are illustrated in FIG. 2 in the form of a diagram.

It is found that for a constant PbO content of approximately 3.9-4 mass % in the fired glaze, an increase in the antibacterial effect sets in as the CuO content goes up.

The CuO content can be increased still further; however, at CuO contents which are in the vicinity of the maximum value of 2 mass %, the glaze may acquire a green coloration, which is unwanted particularly in the area of sanitary products, in spite of the outstanding antimicrobial action.

With regard to the specified oxides of each of the glazes investigated, the presence of these oxides having been determined in each case by a spectral analysis, it can be stated that they include not only fluxes but also opacifiers and also components not specifically added, primarily in the form of impurities. Fluxes of note include, in particular, CaO, $K_2O$ and $Na_2O$; opacifiers, primarily $ZrO_2$ and $SnO_2$. $TiO_2$ acts as a whitener, but is not added separately. The other constituents, such as $Fe_2O_3$, MgO or $HfO_2$, primarily represent impurities.

Figure 3:
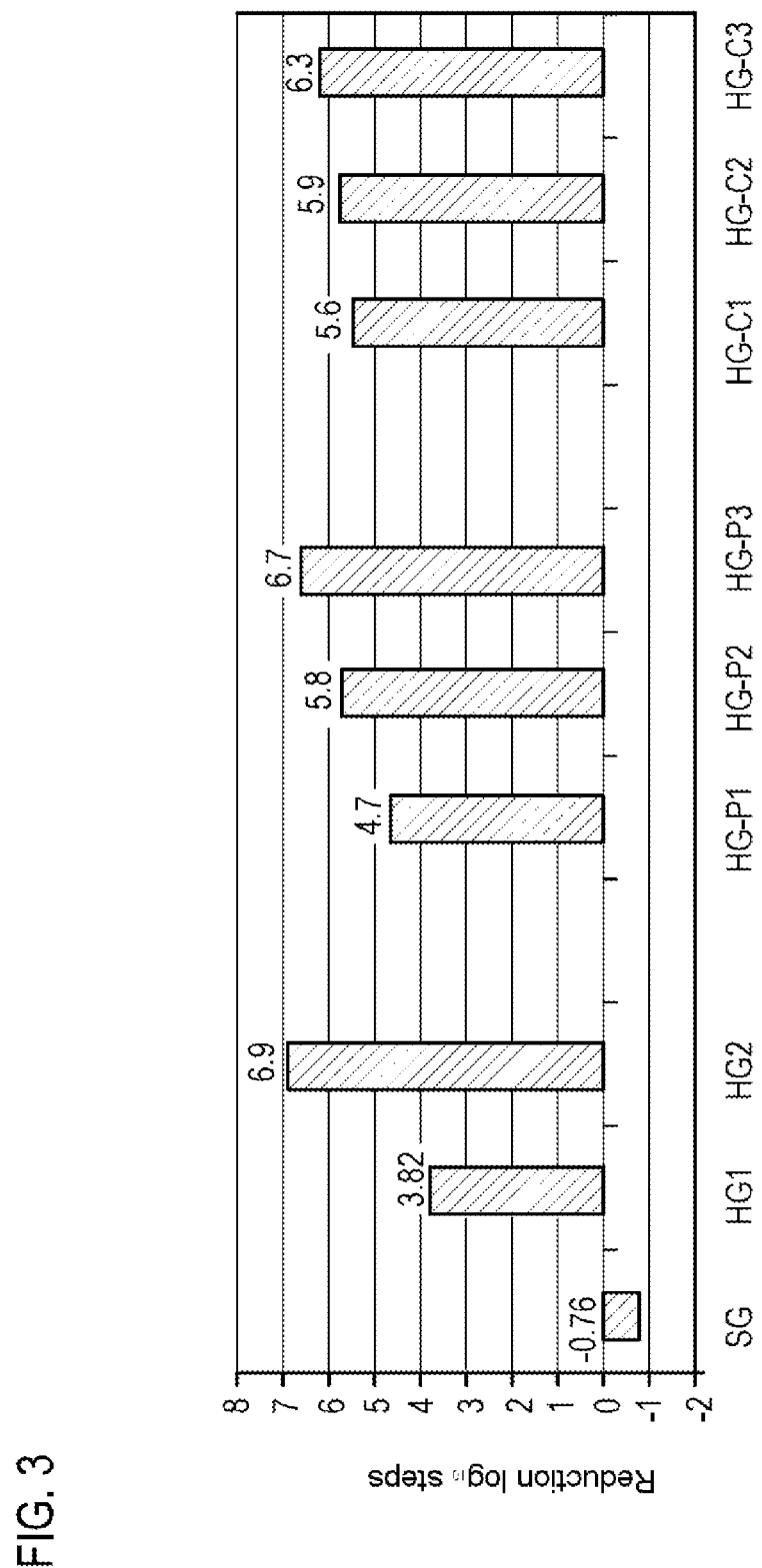
FIG. 3 shows a table for illustrating the antibacterial effect of all the test bodies including a standard glaze without ZnO, PbO, CuO, a comparative glaze based on the standard glaze but additionally containing ZnO, and a particularly effective glaze containing ZnO, PbO and CuO.

In the table shown in FIG. 3, again, all of the reduction rates ascertained are depicted in summary form. Plotted along the abscissa are the respective glazes (standard glaze SG, HG1, HG2, HG-P1, HG-P2, HG-P3, HG-C1, HG-C2, HG-C3), with the respective reduction rate in $\log_{10}$ steps along the ordinate. Quite clearly apparent is the outstanding disinfectant effect of the glazes of the invention comprising not only ZnO but also the metal oxides PbO and CuO, which are evidently responsible for the significantly improved effect, in different mixing proportions or quantitative proportions.

Lastly, a test body with a glaze containing $Bi_2O_3$ was also produced. This glaze contained no PbO and CuO.

Here again, the slip was prepared on the basis of the raw materials batch as per the glaze HG1, and therefore contained ZnO. A $Bi_2O_3$ content of 0.5 mass % was added in powder form. This slip as well was applied by spraying to a prefired ceramic body, with a layer thickness of approximately 1 mm, and was then fired to form the fired glaze.

When the test body was completed, here again, the antimicrobial effect of the glaze surface was investigated in accordance with the JIS standard. A reduction rate of 4.3 $\log_{10}$ steps was ascertained. This reduction rate as well is well above that of the HG1 glaze containing only ZnO. This means that the addition simply of a small amount of $Bi_2O_3$, leads to a significant improvement in the antibacterial glaze quality.

While specific embodiments of the invention have been shown and described in detail to illustrate the inventive principles, it will be understood that the invention may be embodied otherwise without departing from such principles.

We claim:

1. A ceramic article in the form of a sanitary, culinary or laboratory article, comprising a ceramic base body and also a fired glaze applied on said base body, the fired glaze comprising $SiO_2$ at 45-55 mass %, $Al_2O_3$ at 6-12 mass %, ZnO at 15-35 mass %, and additionally PbO at 0.1-15 mass % and/or CuO at 0.025-2 mass % and/or $Bi_2O_3$ at 0.25-7 mass %, wherein the ZnO combined with the PbO and/or CuO and/or $Bi_2O_3$ are in amounts that provide enhanced antimicrobial characteristics compared to antimicrobial characteristics of ZnO alone.

2. The ceramic article according to claim 1, wherein the PbO content is between 0.5-12 mass % and/or the CuO content is between 0.05-1.5 mass % and/or the $Bi_2O_3$ content is between 0.35-6 mass %.

3. The ceramic article according to claim 2, wherein the PbO content is between 0.75-10 mass % and/or the CuO content is between 0.075-1.25 mass % and/or the $Bi_2O_3$ content is between 0.5-5 mass %.

4. The ceramic article according to claim 3, wherein the PbO content is between 1-8 mass % and/or the CuO content is between 0.1-1 mass %.

5. The ceramic article according to claim 1, wherein either both PbO and CuO, but not $Bi_2O_3$, or $Bi_2O_3$, but not PbO and CuO, are included.

6. The ceramic article according to claim 1, wherein the ZnO content is between 18-32 mass %.

7. The ceramic article according to claim 6, wherein the ZnO content is between 20-30 mass %.

8. The ceramic article according to claim 7, wherein the ZnO content is between 22-28 mass %.

9. The ceramic article according to claim 1, wherein the glaze has a layer thickness between 0.1-3 mm.

10. The ceramic article according to claim 9, wherein the layer thickness is between 0.5-1 mm.

11. A ceramic article in the form of a sanitary, culinary or laboratory article, comprising a ceramic base body and also a fired glaze applied on said base body, the fired glaze comprising $SiO_2$ at 45-55 mass %, $Al_2O_3$ at 6-12 mass %, ZnO at 15-35 mass %, and additionally $Bi_2O_3$ at 0.25-7 mass %.

12. A method for producing a ceramic article according to claim 1, comprising the following steps:
providing a ceramic base body which is unfired or has undergone preliminary firing,
applying a glaze coating using a slip comprising a lead frit containing at least 80 mass % of PbO, at 0.12-18 mass % and/or CuO powder at 0.025-2 mass % and/or $Bi_2O_3$ powder at 0.25-7 mass %, wherein the ZnO combined with the PbO and/or CuO and/or $Bi_2O_3$ are in amounts that provide enhanced antimicrobial characteristics compared to antimicrobial characteristics of ZnO alone, and
carrying out firing to form a fired glaze at a temperature of 1100-1350° C.

13. The method according to claim 12, wherein a slip comprising lead frit at 0.6-14.4 mass % and/or CuO powder at 0.05-1.5 mass % and/or $Bi_2O_3$ powder at 0.35-6 mass % is used.

14. The method according to claim 13, wherein a slip comprising lead frit at 0.9-12 mass % and/or CuO powder at 0.075-1.25 mass % and/or $Bi_2O_3$ powder at 0.5-5 mass % is used.

15. The method according to claim 14, wherein a slip comprising lead frit at 0.12-9.6 mass % and/or CuO powder at 0.1-1 mass % is used.

16. The method according to claim 12, wherein a slip is used in which either both PbO and CuO, but not $Bi_2O_3$, or Bi2O3, but not PbO and CuO, are included.

17. The method according to claim 12, wherein a slip comprising ZnO at 18-32 mass % is used.

18. The method according to claim 17, wherein a slip comprising ZnO at 20-30 mass % is used.

19. The method according to claim 18, wherein a slip comprising ZnO at 22-28 mass % is used.

20. The method according to claim 12, wherein the glaze coating is applied with a layer thickness between 0.1-3 mm.

21. The method according to claim 20, wherein the layer thickness is between 0.5-1 mm.

22. The method according to claim 12, wherein the glaze coating is applied in a printing, more particularly screen printing, casting, injecting, spraying, spreading or dipping process or in a combination of at least two of the stated processes.

* * * * *